United States Patent
Kim et al.

(10) Patent No.: US 9,480,922 B1
(45) Date of Patent: Nov. 1, 2016

(54) SYSTEM AND METHOD FOR FACILITATING USE OF TEMPORARY DEFENSIVE STRUCTURES IN A TOWER DEFENSE GAME

(71) Applicant: KABAM, INC., San Francisco, CA (US)

(72) Inventors: John Kim, San Francisco, CA (US); James Koh, Mountain View, CA (US); Kellen Christopher Smalley, Pleasanton, CA (US)

(73) Assignee: Kabam, Inc., San Francisco, CA (US)

( * ) Notice: Subject to any disclaimer, the term of this patent is extended or adjusted under 35 U.S.C. 154(b) by 183 days.

(21) Appl. No.: 14/082,011

(22) Filed: Nov. 15, 2013

(51) Int. Cl.
*A63F 13/00* (2014.01)
*A63F 13/58* (2014.01)
*A63F 13/30* (2014.01)

(52) U.S. Cl.
CPC .............. *A63F 13/58* (2014.09); *A63F 13/12* (2013.01)

(58) Field of Classification Search
CPC ......... A63F 13/12; A63F 13/58; G07F 17/34
See application file for complete search history.

(56) References Cited

U.S. PATENT DOCUMENTS

| | | | |
|---|---|---|---|
| 7,753,795 B2 | 7/2010 | Harris et al. | 463/42 |
| 2007/0207844 A1 | 9/2007 | Pottinger et al. | 463/9 |
| 2007/0218965 A1 | 9/2007 | Tilston et al. | 463/2 |
| 2009/0203446 A1 | 8/2009 | Bradbury et al. | 463/40 |
| 2012/0302352 A1 | 11/2012 | Ajami et al. | 463/42 |
| 2014/0155156 A1* | 6/2014 | Peck et al. | 463/31 |
| 2014/0274409 A1* | 9/2014 | Tinsman et al. | 463/42 |

* cited by examiner

*Primary Examiner* — Milap Shah
*Assistant Examiner* — Thomas H Henry
(74) *Attorney, Agent, or Firm* — Sheppard Mullin Richter & Hampton LLP (57) ABSTRACT

One aspect of the disclosure relates to facilitating use of temporary structures with a time-based expiration in an online game. The online game may be configured to facilitate battles between including virtual units controlled by or associated with one or more users within the game space. The online game may manage a plurality of structures in the game space. The plurality of structures may include a first temporary structure controlled by or associated with a first user. The first temporary structure may provide an advantage to the user in a battle during a first structure time period. The advantage and/or the first temporary structure may expire at the end of the first structure time period.

28 Claims, 4 Drawing Sheets

SYSTEM AND METHOD FOR FACILITATING USE OF TEMPORARY DEFENSIVE STRUCTURES IN A TOWER DEFENSE GAME

FIELD

The disclosure relates to facilitating use of temporary structures with a time-based expiration in an online game.

BACKGROUND

Various techniques for facilitating defense of a user's assets during play of an online game are known. For example, a user may "own" structures located in the world in which the online game is played. Various structures may be used for a myriad of purposes including, for example, storing assets, providing defense to the user's assets, providing offensive attack capabilities, providing housing to the user's characters in the game, and/or other purposes.

Conventional systems, however, restrict the availability of structures for a user. For example, conventional systems often require that a structure be a permanent asset for the user. However, buying and/or maintaining a permanent structure may be expensive. Further, a permanent structure may constrain the user with regard to the options of play available to the user at the location at which the permanent structure is disposed. Further, the structure may only serve a useful purpose at certain points in game play based on, for example, a type of the structure. Other conventional systems may facilitate delivery of a resource to a location in the game's world, where the resource may expire after a predetermined number of uses. Conventional systems suffer from these and other drawbacks.

SUMMARY

One aspect of the disclosure relates to facilitating use of temporary structures with a time-based expiration in an online game. The online game may be configured to facilitate battles between including virtual units controlled by or associated with one or more users within the game space. The online game may manage a plurality of structures in the game space. The plurality of structures may include a first temporary structure controlled by or associated with a first user. The first temporary structure may provide an advantage to the user in battles during a first structure time period. The advantage and/or the first temporary structure may expire at the end of the first structure time period.

A system configured to facilitate use of temporary structures with a time-based expiration in an online game may include one or more processors configured to execute compute program components. The program components may comprise a game component, a virtual unit component, a structure component, and/or other components.

The game component may be configured to execute an instance of a game space. The game component may be configured to facilitate presentation of views of the game space to one or more users. The game component may be configured to facilitate battles including virtual units controlled by or associated with the one or more users within the game space by performing operations in the game space in response to commands received from the one or more users.

The virtual unit component may be configured to manage a plurality of virtual units in the game space. The plurality of virtual units may include, for example, one or more virtual units controlled by or associated with a first user of the one or more users.

The structure component may be configured to manage a plurality of structures in the game space. The plurality of structures may include a first temporary structure controlled by or associated with the first user. The structure component may be configured such that the first temporary structure that provides an advantage to the first user in battles including the first virtual units during a first structure time period, and at the end of the first structure time period, expires.

A computer-implemented method of facilitating use of temporary structures with a time-based expiration in an online game may be implemented on a computer system that includes one or more physical processors. The method may comprise executing a game instance of a game space; facilitating presentation of views of the game space to one or more users; facilitating battles including virtual units controlled by or associated with the one or more users within the game space by performing operations in the game space in response to commands received from the one or more users and wherein the one or more users comprises a first user; managing virtual units in the game space, wherein the virtual units include one or more first virtual units controlled by or associated with the first user; and managing a plurality of structures in the game space, wherein the plurality of structures include a first temporary structure controlled by or associated with the first user, such that the first temporary structure provides an advantage to the first user in battles including the first virtual units during a first structure time period, and at the end of the first structure time period, expires.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
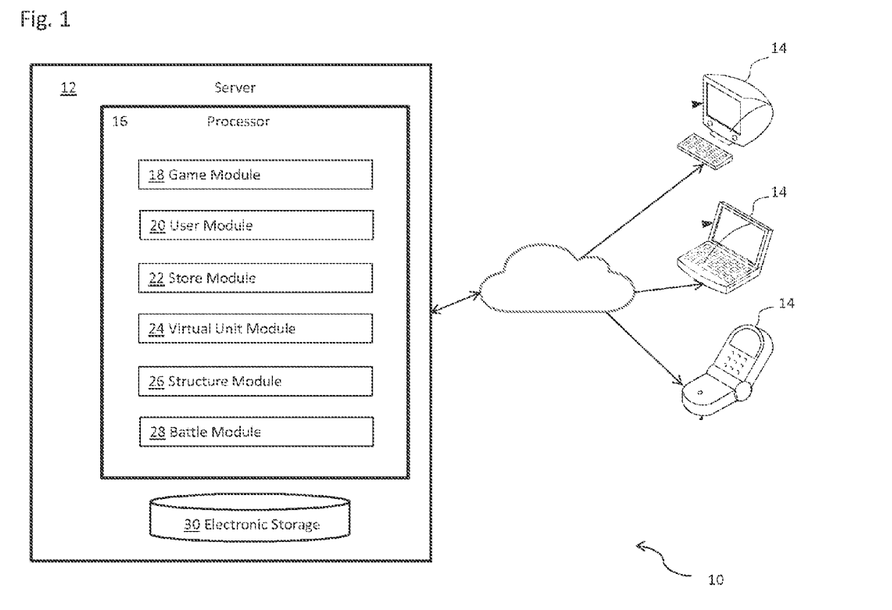
FIG. 1 provides an exemplary illustration of a system configured to facilitate use of temporary structures with a time-based expiration in an online game, according to various aspects of the invention.

FIG. 1 provides an exemplary illustration of a system 10 configured to facilitate use of temporary structures with a time-based expiration in an online game, according to various aspects of the invention. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute computer-readable instructions to implement one or more system components. The components may include one or more of a game component 18, a user component 20, a virtual unit component 22, a store component 24, a structure component 26, a battle component 28, and/or other components.

The game component 18 may be configured to execute an instance of a game space. In some implementations, the game space may be a virtual space. As such, a game space may be an instance of the virtual space. A space component may be configured to implement the instance of the virtual space executed by the computer components to determine state of the virtual space. The state may then be communicated (e.g., via streaming visual data, via object/position data, and/or other state information) from server 12 to client computing platforms 14 for presentation to users. The state determined and transmitted to a given client computing platform 14 may correspond to a view for a user character being controlled by and/or associated with a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the virtual space and/or the game that takes place therein may be persistent. That is, the virtual space and/or the game may continue on whether or not individual users are currently logged in and/or participating in the game. A user that logs out of the virtual space and then logs back in some time later may find the virtual space has been changed through the interactions of other users with the virtual space during the time the user was logged out. These changes may include changes to the simulated physical space, changes in the user's inventory, changes in other user's inventories, changes experienced by non-user characters, and/or other changes.

The above description of the manner in which state of the virtual space is determined by space component is not intended to be limiting. The space component may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user.

The user may have an "inventory" of virtual assets, including, for example, virtual units, virtual structures, virtual currency, virtual items, and/or other virtual assets that are available for the user to use (e.g., by manipulation of a user character, other user controlled element, and/or other items) within the virtual space.

A virtual unit of the user may comprise, for example, a user-controlled element. A virtual unit may comprise one or more attributes associated with the user-controlled element, where an individual attribute may comprise a value associated with an individual level of one or more sequentially ordered levels of value for the individual attribute.

A virtual structure may comprise a virtual object that occupies an area in the game space. The virtual object may comprise a two-dimensional area in the game space, a three-dimensional area in the game space, may occupy either a two-dimensional or three-dimensional area depending upon a view presented of the game space, and/or may otherwise occupy an area in the game space. The virtual structure may provide an advantage to a user in battles including virtual units. A virtual structure may be permanent, temporary, and/or available for another type of temporal unit. A permanent virtual structure may provide the advantage to the user while the user has possession of the permanent virtual structure. A temporary virtual structure may provide an advantage to a user during an associated structure time period, whereby the advantage may expire after that time period. The temporary virtual structure may also no longer be in the user's possession after the associated structure time period. For example, the temporary virtual structure may disappear from the virtual space at the end of the associated structure time period.

In some implementations, the associated structure time period may be persistent. For example, the associated time period may toll regardless of whether the user is logged in or not. In some implementations, the associated structure time period may only toll during one or more of: the user being logged in, the user actively playing the game, the base and/or area at which the temporary structure resides being attacked, the base and/or area at which the temporary structure resides being present in the views presented to the user, and/or during other scenarios related to the online game.

An associated structure time period may have a start and end time that may correlate with a battle in the game space, may have a start and end time that may be independent of a battle in the game space, may have a start time that may correlate with a battle in the game space, may have an end time that may correlate with a battle in the game space, and/or may have other start and end times. A temporary virtual structure may be associated with a type of associated structure time period. For example, a type of associated structure time period may comprise a predetermined amount of time, a user-defined amount of time, a battle-defined amount of time, a game-defined amount of time, and/or another type of time period. The battle-defined time may comprise an amount of time in an individual battle during which the temporary structure may provide an advantage to the user. In some implementations, the predetermined amount of time may be associated with the temporary virtual structure, may be associated with a respective one of a set of costs associated with the temporary virtual structure, may be correlated to a battle, may be correlated to a type of battle, and/or may otherwise be defined. In some implementations, the associated structure time period may be renewable, non-renewable, extendible for a predetermined amount of time, non-extendible, abridgable, non-abridgable, and/or otherwise changeable.

In some implementations, the structure may decay during the associated structure time period. For example, the advantage provided by the structure may lessen based on the amount of time passed of the associated structure time period, damage inflicted by one or more attacks on the structure, and/or based on other factors that may relate to decay of the structure. The advantage provided by the structure may decrease by a certain percentage based on the amount of time, may reduce by a predetermined amount after a predetermined amount of time has passed, and/or may otherwise lessen based on the passage of time.

In some implementations, a user may use virtual currency, real currency, and/or other assets to renew an associated structure time period for a virtual structure. For example, responsive to a determination that an associated structure time period is renewable, a user associated with the structure may use a predetermined amount of assets to renew the associated structure time period. The amount of assets and/or types of assets used may determine an amount of time by which the associated structure time period is renewed. For example, a predetermined set of amounts of assets may renew the associated structure time period by a respective predetermined set of time periods. In another example, one type of currency (e.g., real currency, a virtual asset other than virtual currency, and/or another type of asset) or a mix of multiple types of currencies may renew an associated structure time period for a longer amount of time than virtual currency alone.

In some implementations, a user may use virtual currency, real currency, and/or other assets to extend an associated structure time period for a virtual structure. For example, responsive to a determination that an associated structure time period is extendible, a pla user yer associated with the structure may use a predetermined amount of assets to extend the associated structure time period. The amount of assets and/or types of assets used may determine an amount of time by which the associated structure time period is extended. For example, a predetermined set of amounts of assets may extend the associated structure time period by a respective predetermined set of time periods. In another example, one type of currency (e.g., real currency, a virtual asset other than virtual currency, and/or another type of asset) or a mix of multiple types of currencies may extend an associated structure time period for a longer amount of time than virtual currency alone.

In some implementations, a user may use virtual currency, real currency, and/or other assets to abridge an associated structure time period for a virtual structure associated with another user. For example, responsive to a determination that an associated structure time period is abridgable, a user associated with the structure may use a predetermined amount of assets to abridge the associated structure time period. The amount of assets and/or types of assets used may determine an amount of time by which the associated structure time period is abridged. For example, a predetermined set of amounts of assets may abridge the associated structure time period by a respective predetermined set of time periods. In another example, one type of currency (e.g., real currency, a virtual asset other than virtual currency, and/or another type of asset) or a mix of multiple types of currencies may abridge an associated structure time period for a longer amount of time than virtual currency alone.

Virtual currency may be used by the user for expenditure within the virtual space. For example, virtual currency may be used to purchase items within the virtual space, to upgrade a virtual item of the user, to upgrade a virtual structure of the user, to change an associated structure time period for a temporary virtual structure of the user, to upgrade a level of game play within the virtual space, and/or for other expenditures. In some implementations, virtually currency in an inventory of a user may also be measured to determine whether a user may be eligible for an upgrade, a bonus, and/or other award within the virtual space that takes into account an amount of virtual currency available to the user. Virtual currency may be acquired by a user through one or more of purchase for consideration having a real money value, gift, earned through gameplay, and/or acquired in other ways. Virtual currency may only be exchangeable as consideration in transactions within the game, and/or may be used or consumed outside of transactions.

In implementations in which a user attempts to change, renew, and/or otherwise modify an associated structure time period, a cost of assets to modify the associated structure time period may depend upon an amount of time left in the associated structure time period, whether the user is under attack, whether an area in which the associated virtual structure exists is under attack, whether the associated virtual structure is under attack, an initial cost of the virtual structure, a number of times the associated structure time period has already been modified, and/or other factors related to the virtual structure.

A virtual item of the user may comprise, for example, a virtual object that may be used by the user within the virtual space. A virtual item may affect a virtual unit of the user, a virtual structure of the user, the virtual space in which the online game is played, game logic of the online game, an amount of virtual currency in the inventory of the user, and/or other components of the online game. Examples of virtual items include valuables (money, valuable metals or gems, etc.), weapons, spell components, defense components, armor, wood, stone, herbs, water, ores, animals, monsters, bosses, NPCs, building materials, portions, and/or other virtual objects.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through game component 18).

In some implementations, the game component 18 may be configured to facilitate battles including virtual units controlled by or associated with the one or more users within the game space by performing operations in the game space in response to commands received from the one or more users.

The user component 20 may be configured to access and/or manage one or more user accounts and/or user information associated with users of the system 10. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), information related to an inventory of virtual units, virtual structures, virtual currency, virtual items, and/or other virtual assets of users, virtual space usage information, demographic information associated with users, interaction history among users in the virtual space, information stated by users, purchase information of users, browsing history of users, a client computing platform identification associated with a user, a phone number associated with a user, and/or other information related to users.

The user accounts may include at least a first user account for a first user. The first user account may comprise, for example, information related to an inventory of one or more virtual units under the control of and/or associated with the first user, one or more virtual structures under the control of and/or associated with the first user, and/or other virtual assets of the first user.

Store component 22 may be configured to present a store interface to the users of the game space. The store interface may present offers to users to purchase one or more of a plurality of virtual units, virtual structures, virtual items, and/or other virtual assets. The store component 22 may enable a user to purchase a virtual unit, a virtual structure, a virtual item, and/or other virtual assets for respective associated costs. In some implementations, a cost associated with a temporary virtual structure may be less than a cost associated with a permanent virtual structure, where the temporary virtual structure may provide a same advantage as the permanent virtual structure. In some implementations, a temporary virtual structure that may provide a first set of advantages may be available via the store interface, while a permanent virtual structure providing the first set of advantages may not be available. The store component 22 may be configured to present a subset of the plurality of virtual structures available in the online game to the user. The store component 22 may be configured to determine the subset of the virtual structures to present based on one or more of: game logic in the game, a skill level of the user, a level of game play of the user, and/or other criteria.

In some implementations, a cost associated with a temporary virtual structure to be placed at a first location in the virtual space may be different from a cost to place the temporary virtual structure at a second location in the virtual space. A cost to place a temporary virtual structure at a location in the virtual space may be associated, for example, with a defense value based on positioning the temporary virtual structure at that location.

In some implementations, a virtual unit and/or a virtual structure may be obtained by a user by purchasing the virtual unit and/or the virtual structure via the store interface presented by the store component 22. In some implementations, a virtual unit and/or a virtual structure may be obtained by a user during game play. For example, a user may obtain a virtual unit and/or a virtual structure as a prize in the game. The user may obtain a virtual unit and/or a virtual structure for achieving a subsequent level in game play. In some examples, the user may obtain a virtual unit and/or a virtual structure for achieving the subsequent level in game play while maintaining a predetermined level of virtual assets. In another example, the user may obtain a virtual unit and/or a virtual structure based on a relationship, affiliation, and/or other association of the user in the game space. In yet another example, the user may obtain a virtual unit and/or a virtual structure as a bonus item after purchasing a predetermined number of items and/or spending a predetermined amount of virtual currency via the store interface presented by the store component 22. In another example, the user may obtain a virtual unit and/or a virtual structure based on the game logic of the online game. Other ways of obtaining a virtual unit and/or a virtual structure may be available to the user as well.

The virtual unit component 24 may be configured to manage a plurality of virtual units in the game space. The plurality of virtual units may include, for example, include troops, drones, medical units, mechanical repair units, or other virtual units controlled by or associated with a user. The plurality of virtual units may include, for example, a first set of virtual units controlled by or associated with a first user of the one or more users. In some implementations, the plurality of virtual units may include the first set of virtual units, a second set of virtual units controlled by or associated with a second user of the one or more users, and/or other sets of virtual units. The plurality of virtual units may include virtual units of one or more types.

The structure component 26 may be configured to manage a plurality of virtual units in the game space. The plurality of virtual structures may include, for example, biological buildings, artificially-constructed buildings, walls, pylons, towers, monuments, dams, bridges, and/or other virtual structures controlled by or associated with a user. The plurality of virtual structures may include, for example, a first set of virtual structures controlled by or associated with a first user of the one or more users. For example, the first set of virtual structures associated with the first user may include biologically-evolved creatures that serve as buildings controlled by or associated with the first user, buildings that are constructed by virtual units controlled by or associated with the first user, walls fortifying an area in the game space that is associated with the first user, pylons for mounting equipment, watch towers, and/or other virtual structures. In some implementations, the plurality of virtual structures may include the first set of virtual structures, a second set of virtual structures controlled by or associated with a second user of the one or more users, and/or other sets of virtual structures. The plurality of virtual structures may include virtual structures of one or more types.

The structure component 26 may be configured to enable a user to obtain a temporary virtual structure based on one of: game logic of the online game, achieving a skill level in the online game, achieving a predetermined amount of virtual assets in the online game, or receiving a prize in the online game. In some implementations, the structure component 26 may make available to the user one or more temporary virtual structures that were not previously available to the user based on one or more of: game logic of the online game, achieving a skill level in the online game, achieving a predetermined amount of virtual assets in the online game, or receiving a prize in the online game. For example, the structure component 26 may make available temporary virtual structures associated with a structure time period may be changeable responsive to the user achieving a skill level in the online game.

The structure component 26 may facilitate expiration of the temporary virtual structure at the end of the structure time period associated with the temporary virtual structure. For example, the structure component 26 may facilitate expiration by having the temporary virtual structure disappear from the virtual space. In another example, the structure component 26 may facilitate expiration by no longer enabling the temporary virtual structure to provide any advantages previously provided by the temporary virtual structure. The structure component 26 may facilitate expiration in other ways as well.

Responsive to a temporary virtual structure having a changeable structure time period, the structure component 26 may enable a user to renew a structure time period associated with the temporary virtual structure for a renewal time period such that the temporary virtual structure does not expire at the end of the structure time period. The structure component 26 may prompt the user to provide instructions regarding whether the user would like to renew a predetermined time period before expiration of the structure time period. In some implementations, the structure component 26 may provide one or more prompts to the user to provide instructions prior to and/or at expiration of the structure time period. By renewing the structure time period for a renewal time period, the structure component 26 may be configured to enable the temporary virtual structure to provide an advantage to the user in battles after the expiration of the structure time period for the renewal time period. In some implementations, the structure component 26 may require the user to provide consideration before the user may renew the temporary virtual structure. Consideration may comprise, for example, virtual currency, virtual items, forfeiture of another virtual structure and/or features associated with another virtual structure, and/or other virtual assets of the user. The renewal time period may be effective responsive to the structure component 26 receiving consideration, responsive to the expiration of the structure time period, responsive to a user-defined start, responsive to a game-defined start, responsive to a beginning of a next battle in which the temporary virtual structure is used, and/or at other times. In some implementations, the structure component 26 may limit a number of renewals available for a temporary virtual structure. The number of renewals available for a temporary virtual structure may vary based on type of structure, use of structure, how many battles the structure has been used in, an amount of time in the structure time period, and/or other criteria.

The battle component 28 may be configured to facilitate a battle involving at least some individual virtual units of the first set of virtual units controlled by or associated with the first user. In some implementations, battle component 28 may facilitate attacks by virtual units on one another, structures of the game space, or other elements in the game space. For example, battle component 28 may facilitate attacks by game-controlled units on one or more virtual units and/or one or more of a user to inflict damage on the virtual units of the user. The virtual units of the user may prevent an attack by game-controlled units and/or may inflict damage on the game-controlled units. In another example, battle component 28 may facilitate attacks by one or more virtual units of a second user on one or more virtual units of a user to inflict damage on the virtual units of the first user. The virtual units of the first user may prevent an attack by virtual units of the second user and/or may inflict damage on the virtual units of the second user. The battle component 28 may enable a user to direct one or more virtual units to participate in a battle by selecting the one or more virtual units and directing the one or more virtual units to participate in the battle.

The structure component 26 may facilitate placing a temporary virtual structure at a first location in the virtual space in anticipation of a battle occurring in the virtual space. In some implementations, the structure component 27 may be configured to provide a user with one or more estimates of defense value based on positioning a temporary virtual structure at respective one or more locations in the virtual space. For example, the structure component 26 may receive information relating to one or more locations at which to place a temporary virtual structure, may determine estimates of defense value provided by the temporary virtual structure at each of the one or more locations, and may provide the respective one or more estimates of defense to the user.

In some implementations, the structure component 26 may receive a request from a user to provide an optimal location for a temporary virtual structure during a battle. The structure component 26 may be configured to determine an optimal location based on defense values associated with placing the temporary virtual structure at various locations in the virtual space, and may provide information relating to location with the highest (or lowest) estimated defense value to the user.

In some implementations, the structure component 26 may be configured to provide a user with an estimate of a defense value based on placing a plurality of temporary virtual structures at a respective plurality of locations in the virtual space. For example, for each temporary virtual structure of a plurality of virtual structures that the user wants to use in a battle, the structure component 26 may receive information relating to one or more locations at which to place an individual temporary virtual structure. The structure component 26 may determine estimates of defense value provided by the plurality of temporary virtual structures based on different configurations of locations at which individual temporary virtual structures may be placed. The structure component 26 may also take into account whether any restrictions exist regarding placing a temporary virtual structure at a predetermined distance from a second temporary virtual structure, whether any restrictions exist regarding placing a temporary virtual structure at a predetermined distance from a near a permanent structure, and/or any other restrictions associated with the user and/or placement of the temporary virtual structure. The structure component 26 may provide the respective one or more estimates of defense to the user, where each estimate of defense value is associated with a set of locations at which to place the individual temporary virtual structures. In some implementations, the structure component 26 may provide a predetermined number of the highest (or lowest) defense value estimates.

In some implementations, the structure component 26 may receive a request from a user to provide an optimal location for a plurality of temporary virtual structures during a battle. The structure component 26 may be configured to determine an optimal set of locations for the individual temporary virtual structures based on determined estimates of defense value associated with placing the temporary virtual structures at various locations in the virtual space, and may provide information relating to the optimal set of locations with the highest (or lowest) estimated defense value to the user.

Figure 2A:
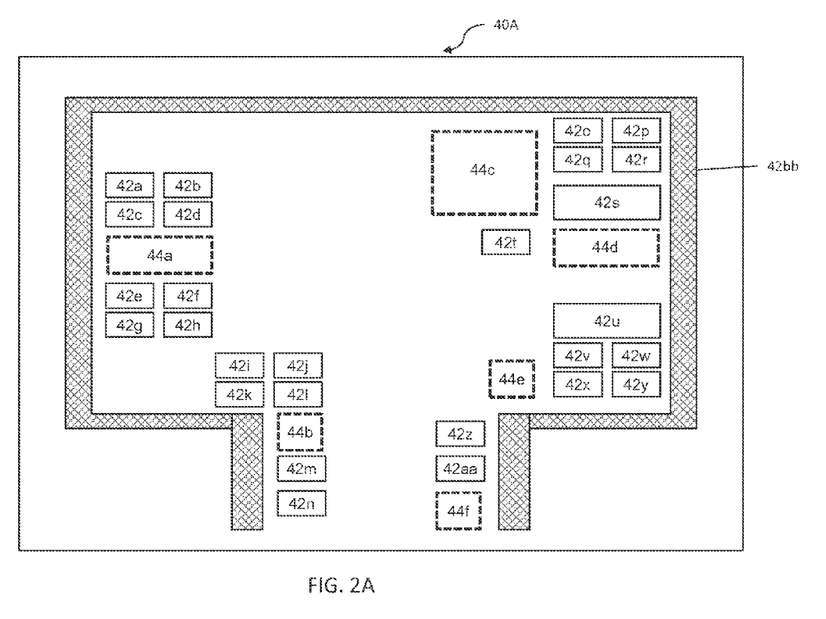
FIG. 2A provides an exemplary illustration of a virtual space portraying one or more structures at a first time period, according to various aspects of the invention.
Figure 2B:
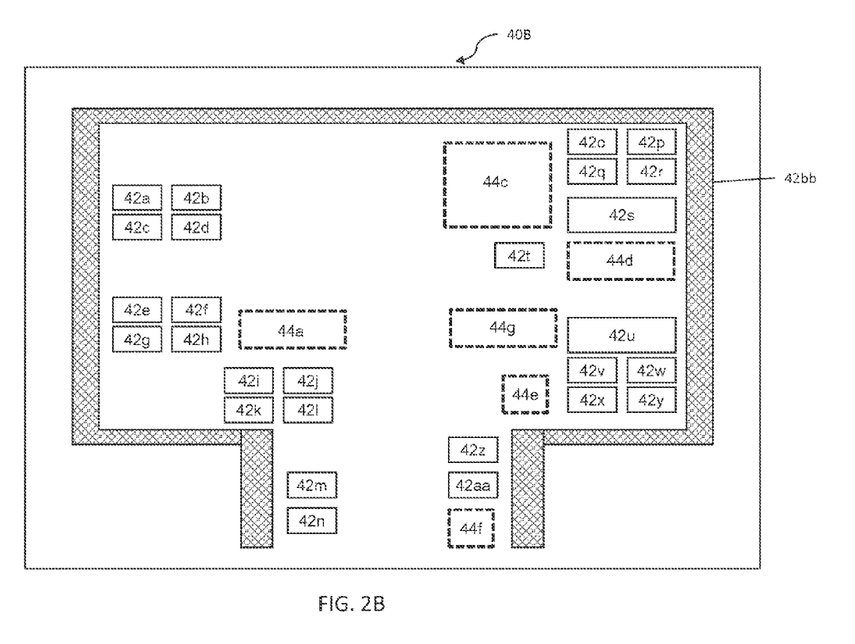
FIG. 2B provides an exemplary illustration of a virtual space portraying one or more structures at a second time period, according to various aspects of the invention.

Based on the received information relating to the estimates of defense value, the structure component 26 may be configured to enable a user to change a position of a temporary virtual structure for a battle. For example, the structure component 26 may be configured to enable a user to change a location of a temporary virtual structure from a first location for a first battle in the virtual space to a second location in the virtual space for a second battle. FIGS. 2A and 2B illustrate user interfaces 200 and 202 depicting views presented to a user that relate to a first battle and a second battle, respectively, in accordance with one or more implementations. In one use case, with respect to FIG. 2A, user interface 200 may present the first view 40A of the game space to the user. As shown, the first view 40A of the game space may depict the permanent structures 42a, 42b, . . . , 42bb and a first set of temporary structures 44a, 44b, . . . , 44f. In another use case, with respect to FIG. 2B, user interface 202 may present the second view 40B of the game space to the user. As shown, the second view 40B of the game space may depict the permanent structures 42a, 42b, . . . , 42bb and a second set of temporary structures 44a, 44b, . . . , 44g. Thus, among other benefits, damage to the high-priority structure 204 may be avoided or otherwise reduced.

In some implementations, the online game may comprise, in part or in whole, a tower defense game. The tower defense game may present a map which represents an area which a user may defend from enemy crossing. In a tower defense game, a user may build virtual structures (e.g., traps, towers, and/or other virtual structures) to slow or prevent an enemy's passage. Both enemies and the structures may have varied values, costs, upgrade opportunities, and/or other characteristics associated therewith. A user may position both permanent and temporary virtual structures in a tower defense game to maximize the user's ability to stop an enemy onslaught. In some implementations, the virtual structures (temporary and/or permanent) may serve a defensive purpose in the online game.

In some implementations, the server 12, client computing platforms 14, and/or other components of the system 10 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or other components of the system 10 may be operatively linked via some other communication media.

A given client computing platform 14 may include one or more processors configured to execute computer program components. The computer program components may be configured to enable an expert or user associated with the given client computing platform 14 to interface with system 10 and/or other components of the system 10, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 30, one or more processors 16, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14 and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute components 18, 20, 22, 24, 26, 28, and/or other components. Processor 16 may be configured to execute components 18, 20, 22, 24, 26, 28, and/or other components by software; hardware; firmware; some combination of software, hardware, and/or firmware; and/or other mechanisms for configuring processing capabilities on processor 16.

It should be appreciated that although components 18, 20, 22, 24, 26, 28, and/or other components are illustrated in FIG. 1 as being co-located within a single processing unit, in implementations in which processor 16 includes multiple processing units, one or more of components 18, 20, 22, 24, 26, 28, and/or other components may be located remotely from the other components. The description of the functionality provided by the different components 18, 20, 22, 24, 26, 28, and/or other components described below is for illustrative purposes, and is not intended to be limiting, as any of components 18, 20, 22, 24, 26, 28, and/or other components may provide more or less functionality than is described. For example, one or more of components 18, 20, 22, 24, 26, 28, and/or other components may be eliminated, and some or all of its functionality may be provided by other ones of components 18, 20, 22, 24, 26, 28, and/or other components. As another example, processor 16 may be configured to execute one or more additional components that may perform some or all of the functionality attributed below to one of components 18, 20, 22, 24, 26, 28, and/or other components.

Figure 3:
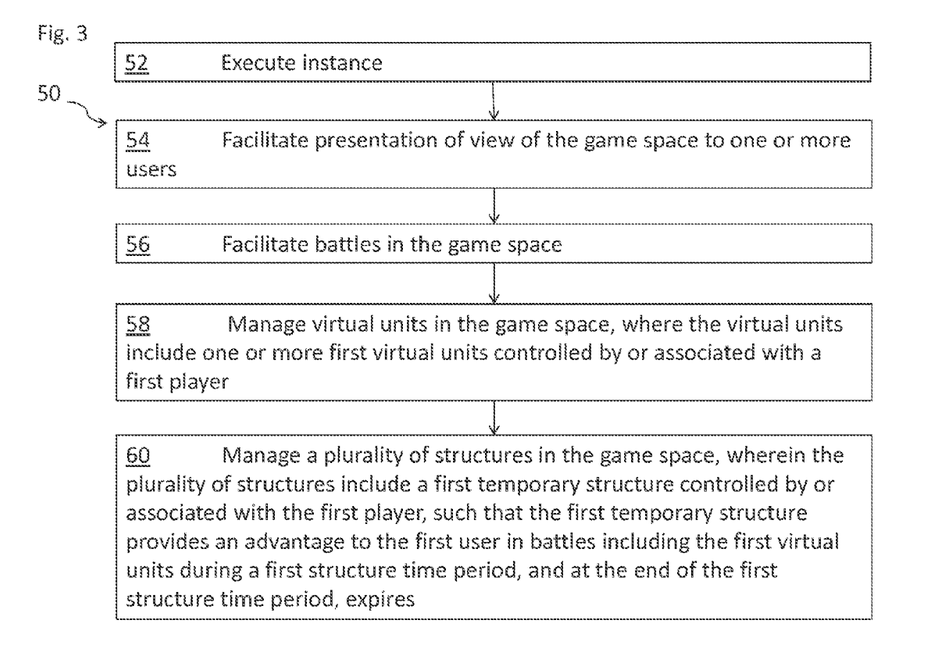
FIG. 3 illustrates an exemplary method of facilitating use of temporary structures with a time-based expiration in an online game, according to various aspects of the invention.

FIG. 3 illustrates a method 50 of facilitating provision of multilevel upgrade items to one or more users of an online game, according to various aspects of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a game component the same as or similar to game component 18 (shown in FIG. 1 and described above).

At an operation 54, views of the game space may be presented to one or more users. The views may be presented to users via client computing platforms. In some implementations, operation 54 may be performed by a game component the same as or similar to game component 18 (shown in FIG. 1 and described above).

At an operation 56, battles including virtual units controlled by or associated with the one or more users may be facilitated within the game space by performing operations in the game space. The battles may be facilitated in response to commands received from the one or more users. In some implementations, operation 56 may be performed by a game component the same as or similar to game component 18 (shown in FIG. 1 and described herein) and/or a battle component the same as or similar to battle component 28 (shown in FIG. 1 and described herein).

At operation 58, a plurality of virtual units in the game space may be managed. The plurality of virtual units may include a first set of virtual units controlled by and/or associated with a first user of the one or more users. In some implementations, operation 58 may be performed by a virtual unit component the same as or similar to virtual unit component 24 (shown in FIG. 1 and described herein).

At an operation 60, one or more virtual units may be managed in the game space. The virtual units managed in the game space may include one or more first virtual units controlled by or associated with the first user. In some implementations, operation 60 may be performed by a virtual unit component the same as or similar to virtual unit component 24 (shown in FIG. 1 and described herein).

At an operation 60, a plurality of structures may be managed in the game space. The plurality of structures may include a first temporary structure controlled by or associated with the first user. The first temporary structure may provide an advantage to the first user in battles including the first virtual units during a first structure time period. At the end of the first structure time period, the advantage provided (and/or the first temporary structure) may expire. In some implementations, operation 60 may be performed by a structure component the same as or similar to structure component 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for facilitating use of temporary structures with a time-based expiration in an online game, the system comprising:
one or more processors configured by machine-readable instructions to:
execute a game instance of a game space, and to use the game instance to generate game state information that is transmitted to client computing platforms over a network, the game state information facilitating presentation of views of the game space to one or more users via client computing platforms, wherein battles including virtual units controlled by or associated with the one or more users within the game space are facilitated by performing operations in the game space in response to commands received over the network from the one or more client computing platforms associated with the one or more users and wherein the one or more users comprises a first user;
manage virtual units in the game space, wherein the virtual units include one or more first virtual units controlled by or associated with the first user; and
manage a plurality of virtual structures in the game space, wherein the plurality of virtual structures include a first temporary structure controlled by or associated with the first user, the first temporary structure containing one or more of the first virtual units, such that by virtue of the first temporary structure containing one or more of the first virtual units, the first temporary structure provides an advantage to the first user in battles including one or more of the first virtual units during a first structure time period, and at the end of the first structure time period, the first temporary structure and the one or more of the first virtual units expire such that the first temporary structure and the one or more of the first virtual units are no longer controlled by or associated with the first user and the advantage is no longer provided to the first user.

2. The system of claim 1, wherein the one or more processors are further configured by machine-readable instructions such that the first temporary structure and the first virtual units disappear at the end of the first structure time period.

3. The system of claim 1, wherein the first structure time period comprises an amount of time, wherein a start time and an end time of the first structure time period is not dependent upon a battle in the game space.

4. The system of claim 1, wherein the first structure time period comprises a battle time period, wherein the battle time period comprises an amount of time in an individual battle during which the first temporary structure provides the advantage to the first user.

5. The system of claim 1, wherein the one or more processors are further configured by machine-readable instructions to provide the first user with a first estimate of defense value based on positioning the first temporary structure at a first location in the game space and a second estimate of defense value based on positioning the first temporary structure at a second location in the game space.

6. The system of claim 5, wherein the one or more processors are further configured by machine-readable instructions to enable the first user to change a location of the first temporary structure from the first location for a first battle in the game space to the second location in the game space for a second battle in the game space.

7. The system of claim 1, wherein one or more of the plurality of virtual structures associated with the first user comprises a first permanent structure that is disposed in the game space, and wherein the first permanent structure provides a first permanent advantage to the first user in battles.

8. The system of claim 1, wherein the one or more processors are further configured by machine-readable instructions to present a store interface to the users, wherein the store interface presents a plurality of virtual items to the one or more users to purchase for a respective plurality of costs, the plurality of virtual items comprising one or more temporary structures, the one or more temporary structures comprising the first temporary structure.

9. The system of claim 8, wherein a first cost to purchase the first temporary structure to be placed at a first location in the game space is different from a second cost to purchase the first temporary structure to be placed at a second location in the game space.

10. The system of claim 8, wherein one or more processors are further configured by machine-readable instructions to:
present the one or more temporary structures based on one or more of: game logic in the game, a skill level of the first user, or a level of game play of the first user.

11. The system of claim 1, wherein the one or more processors are further configured by machine-readable instructions to:
enable the first user to obtain the first temporary structure based on one of: game logic of the online game, achieving a skill level in the online game, achieving a predetermined amount of virtual assets in the online game, or receiving a prize in the online game.

12. The system of claim 1, wherein the first structure time period may be renewable such that the first temporary structure may provide an advantage to the first user in battles after the expiration of the first structure time period for a renewal time period.

13. The system of claim 12, wherein the one or more processors are further configured by machine-readable instructions to limit a number of renewals of the first structure time period for the first temporary structure by the first user.

14. The system of claim 1, wherein the first temporary structure is located within a first area of the game space that is controlled by the first user.

15. A computer-implemented method of facilitating use of temporary structures with a time-based expiration in an online game, the method being implemented on a computer system that includes one or more physical processors, the method comprising:
executing a game instance of a game space and using the game instance to generate game state information that is transmitted to client computing platforms over a network;
facilitating presentation of views of the game space to users via client computing platforms;
facilitating battles including virtual units controlled by or associated with the one or more users within the game space by performing operations in the game space in response to commands received over the network from the one or more client computing platforms associated with the one or more users and wherein the one or more users comprises a first user;
managing virtual units in the game space, wherein the virtual units include one or more first virtual units controlled by or associated with the first user; and
managing a plurality of virtual structures in the game space, wherein the plurality of virtual structures include a first temporary structure controlled by or associated with the first user, the first temporary structure containing one or more of the first virtual units, such that by virtue of the first temporary structure containing one or more of the first virtual units, the first temporary structure provides an advantage to the first user in battles including one or more of the first virtual units during a first structure time period, and at the end of the first structure time period, the first temporary structure and the one or more of the first virtual units expire such that the first temporary structure and the one or more of the first virtual units are no longer controlled by or associated with the first user and the advantage is no longer provided to the first user.

16. The method of claim 15, wherein the first temporary structure and the first virtual units disappear at the end of the first structure time period.

17. The method of claim 15, wherein the first structure time period comprises an amount of time, wherein a start time and an end time of the first structure time period is not dependent upon a battle in the game space.

18. The method of claim 15, wherein the first structure time period comprises a battle time period, wherein the battle time period comprises an amount of time in an individual battle during which the first temporary structure provides the advantage to the first user.

19. The method of claim 15, further comprising:
providing the first user with a first estimate of defense value based on positioning the first temporary structure at a first location in the game space and a second estimate of defense value based on positioning the first temporary structure at a second location in the game space.

20. The method of claim 19, further comprising:
enabling the first user to change a location of the first temporary structure from the first location for a first battle in the game space to the second location in the game space for a second battle in the game space.

21. The method of claim 15, wherein one or more of the plurality of virtual structures associated with the first user comprises a first permanent structure that is disposed in the game space, and wherein the first permanent structure provides a first permanent advantage to the first user in battles.

22. The method of claim 15, further comprising:
presenting a store interface to the users, wherein the store interface presents a plurality of virtual items to the one or more users to purchase for a respective plurality of costs, the plurality of virtual items comprising one or more temporary structures, the one or more temporary structures comprising the first temporary structure.

23. The method of claim 22, wherein a first cost to purchase the first temporary structure to be placed at a first location in the game space is different from a second cost to purchase the first temporary structure to be placed at a second location in the game space.

24. The method of claim 22, further comprising:
presenting the one or more temporary structures based on one or more of: game logic in the game, a skill level of the first user, or a level of game play of the first user.

25. The method of claim 15, further comprising:
enabling the first user to obtain the first temporary structure based on one of: game logic of the online game, achieving a skill level in the online game, achieving a predetermined amount of virtual assets in the online game, or receiving a prize in the online game.

26. The method of claim 15, wherein the first structure time period may be renewable such that the first temporary structure may provide an advantage to the first user in battles after the expiration of the first structure time period for a renewal time period.

27. The method of claim 26, further comprising:
limiting a number of renewals of the first structure time period for the first temporary structure by the first user.

28. The method of claim 15, wherein the first temporary structure is located within a first area of the game space that is controlled by the first user.

* * * * *